(12) United States Patent
Bryan et al.

(10) Patent No.: US 11,833,418 B2
(45) Date of Patent: Dec. 5, 2023

(54) DISCRETE HAPTICS FOR KEYBOARD PALM REST

(71) Applicant: Dell Products, L.P., Round Rock, TX (US)

(72) Inventors: Rex W. Bryan, Round Rock, TX (US); Deeder M. Aurongzeb, Austin, TX (US); Peng Lip Goh, Singapore (SG)

(73) Assignee: Dell Products L.P., Round Rock, TX (US)

(*) Notice: Subject to any disclaimer, the term of this patent is extended or adjusted under 35 U.S.C. 154(b) by 253 days.

(21) Appl. No.: 17/321,152

(22) Filed: May 14, 2021

(65) Prior Publication Data

US 2022/0362663 A1 Nov. 17, 2022

(51) Int. Cl.

| | |
|---|---|
| G06F 3/01 | (2006.01) |
| G06F 3/041 | (2006.01) |
| A63F 13/285 | (2014.01) |
| G06F 3/16 | (2006.01) |
| G10L 25/51 | (2013.01) |
| G06F 3/02 | (2006.01) |
| G06T 7/20 | (2017.01) |
| A63F 13/52 | (2014.01) |
| A63F 13/54 | (2014.01) |
| G06V 10/60 | (2022.01) |
| G06F 18/24 | (2023.01) |

(52) U.S. Cl.
CPC .......... *A63F 13/285* (2014.09); *A63F 13/52* (2014.09); *A63F 13/54* (2014.09); *G06F 3/016* (2013.01); *G06F 3/0202* (2013.01); *G06F 3/165* (2013.01); *G06F 18/24* (2023.01); *G06T 7/20* (2013.01); *G06V 10/60* (2022.01); *G10L 25/51* (2013.01); *A63F 2300/1037* (2013.01); *A63F 2300/6081* (2013.01)

(58) Field of Classification Search
CPC .......... A63F 13/24; A63F 13/25; A63F 13/28; A63F 13/285; A63F 2300/1037; G06F 3/011; G06F 3/016; G06F 2203/013; G06F 2203/014; H05K 7/20; H10N 10/13
See application file for complete search history.

(56) References Cited

U.S. PATENT DOCUMENTS

| | | | |
|---|---|---|---|
| 2016/0202760 A1* | 7/2016 | Churikov | G06F 3/0416 345/173 |
| 2019/0249908 A1* | 8/2019 | Yi | A63F 13/285 |
| 2021/0181848 A1* | 6/2021 | Sanders | A63F 13/212 |

* cited by examiner

*Primary Examiner* — Lawrence S Galka
(74) *Attorney, Agent, or Firm* — Fogarty LLP

(57) ABSTRACT

Systems and methods provide haptic feedback at locations of a keyboard palm rest during operation of a software program, such as a video game. During game play, a haptic event, such as an explosion, is detected within the game. A magnitude of the event and a direction of the event from a reference location in the game, such as an avatar's location, are determined. Haptic feedback locations on the palm rest are selected based on the magnitude of the event and the direction of the event from the reference location. Mechanical and thermal haptic feedback are generated at the selected locations of the palm rest, where the strength and timing of the feedback at each location are selected based on the magnitude and direction information for the event. Embodiments thus provide multi-dimensional haptic feedback that relates positional awareness to a user of events occurring within a video game.

15 Claims, 7 Drawing Sheets

DISCRETE HAPTICS FOR KEYBOARD PALM REST

FIELD

This disclosure relates generally to peripheral devices utilized by Information Handling Systems (IHSs), and more specifically, to keyboards used by IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

IHSs may be operated using a variety of peripheral devices that may be connected to the IHS through couplings that may be wired or wireless. Such peripheral devices may include external keyboards that support various key entry inputs to various types of IHSs, including desktop computers, laptops, convertible (i.e., hybrid) laptops and tablets. For desktop computers, external keyboards are typically utilized during operation of most all user software applications that are supported by an IHS. External keyboards may also be commonly used with other types of IHSs. In particular, external keyboards may be utilized in playing video games using an IHS. The user may utilize the keyboard in a myriad of ways to participate in various aspects of game play, where the video game software may operate in full or in part on the IHS and may allow the user to participate in game play with any number of other individuals. As part of an enhancement to game play, some peripheral devices support haptic feedback that may provide a user with various types of sensory feedback in conjunction with events occurring within the game.

SUMMARY

Various embodiments provide methods for supporting haptic feedback during operation of a software program on an IHS (Information Handling System). The methods may include: detecting a haptic event in the operation of the software program on the IHS; determining a magnitude of the haptic event; determining a direction of the haptic event from a reference location in a user interface of the software program; selecting one or more haptic feedback locations on a palm rest of a keyboard coupled to the IHS, wherein the haptic feedback locations on the palm rest are selected based on the magnitude of the haptic event and further based on the direction of the haptic event from the reference location; and generating mechanical feedback and thermal feedback at the selected haptic feedback locations of the palm rest, wherein a strength and a timing of the mechanical and thermal feedback at each location of the palm rest are selected based on the magnitude of the haptic event and further based on the direction of the haptic event from the reference location.

In additional method embodiments, the software application is a video game and wherein the reference location in the user interface of the video game comprises a location of a video game avatar of a user of the IHS. In additional method embodiments, the haptic event comprises an explosive visual event within the user interface of the video game and wherein the explosive visual event is detected based on detection of a brightness spike in an area of the user interface during operation of the video game. In additional method embodiments, the haptic event comprises an explosive audio event within operation of the video game and wherein the explosive audio event is detected based on detection of an amplitude spike in audio of the video game. In additional embodiments, methods may further include classifying an area of the user interface in which the bright brightness spike is detected based on proximity of the area to the reference location of the video game avatar and further based on a direction of the area relative to the avatar. In additional method embodiments, the one or more haptic feedback locations on the palm rest are further selected based on the classification of the area of the user interface in which the brightness spike is detected. In additional embodiments, methods may further include determining the explosive visual event is in motion in the video game, wherein the timing of the mechanical and thermal feedback at each location of the palm rest is selected based characteristics of the motion of the explosive visual event. In additional method embodiments, the characteristics of the motion of the explosive visual event comprise a direction of the motion relative to the avatar and wherein the timing of the mechanical and thermal feedback at each selected location of the palm rest relates the direction of the motion of the explosive visual event relative to the avatar. In additional method embodiments, the one or more haptic feedback locations on the palm rest are selected based on a direction within the video game of the explosive visual event from the avatar.

In various additional embodiments, Information Handling Systems (IHSs) may be configured for providing haptic feedback during operation of a software program. The IHSs may include: a keyboard comprising a palm rest with one or more haptic feedback locations; one or more processors; one or more memory devices coupled to the processors, the memory devices storing computer-readable instructions that, upon execution by the processors, cause the IHS to: detect a haptic event in the operation of the software program on the IHS; determine a magnitude of the haptic event; determine a direction of the haptic event from a reference location in a user interface of the software program; select one or more haptic feedback locations on the keyboard palm rest, wherein the haptic feedback locations on the palm rest are selected based on the magnitude of the haptic event and further based on the direction of the haptic event from the reference location; and generate mechanical feedback and thermal feedback at the selected haptic feedback locations of the palm rest, wherein a strength and a timing of the mechanical and thermal feedback at each location of the palm rest are selected based on the magnitude of the haptic event and further based on the direction of the haptic event from the reference location.

In additional IHS embodiments, the software application is a video game and wherein the reference location in the user interface of the video game comprises a location of a video game avatar of a user of the IHS. In additional IHS embodiments, the one or more haptic feedback locations of the palm rest comprise a thermal generator coupled to a mechanical actuator. In additional IHS embodiments, the haptic event comprises an explosive visual event within the user interface of the video game and wherein the explosive visual event is detected based on detection of a brightness spike in an area of the user interface during operation of the video game. In additional IHS embodiments, the haptic event comprises an explosive audio event within operation of the video game and wherein the explosive audio event is detected based on detection of an amplitude spike in audio of the video game. In additional IHS embodiments, the one or more haptic feedback locations on the palm rest are selected based on a direction within the video game of the explosive visual event from the avatar.

In various additional embodiments, keyboards support key entry to an IHS (Information Handling System) during the operation of a software program on the IHS. The keyboards may include: a plurality of keys; one or more logic units; and a palm rest with one or more haptic feedback locations, wherein one or more of the haptic feedback locations are selected for providing mechanical and thermal feedback in response to the detection of a haptic event in the operation of the software program on the IHS, wherein the one or more logic units of the palm rest are configured to: receive a signal activating a mechanical actuator at a plurality of the haptic feedback locations, wherein the plurality of haptic feedback locations on the palm rest are selected based on the magnitude of the haptic event and further based on the direction of the haptic event from the reference location; and generate mechanical feedback and thermal feedback at the selected haptic feedback locations of the palm rest, wherein a strength and a timing of the mechanical and thermal feedback at each location of the palm rest are selected based on the magnitude of the haptic event and further based on the direction of the haptic event from the reference location.

In additional keyboard embodiments, the palm rest is detachable from the keyboard. In additional keyboard embodiments, the one or more haptic feedback locations of the palm rest comprise a thermal generator coupled to a mechanical actuator. In additional keyboard embodiments, the software application is a video game and wherein the reference location in the user interface of the video game comprises a location of a video game avatar of a user of the IHS. In additional keyboard embodiments, the timing of the mechanical and thermal feedback generated at each of the selected haptic feedback of the locations of the palm rest is determined based on a direction of a movement of the haptic event relative the location of the avatar.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
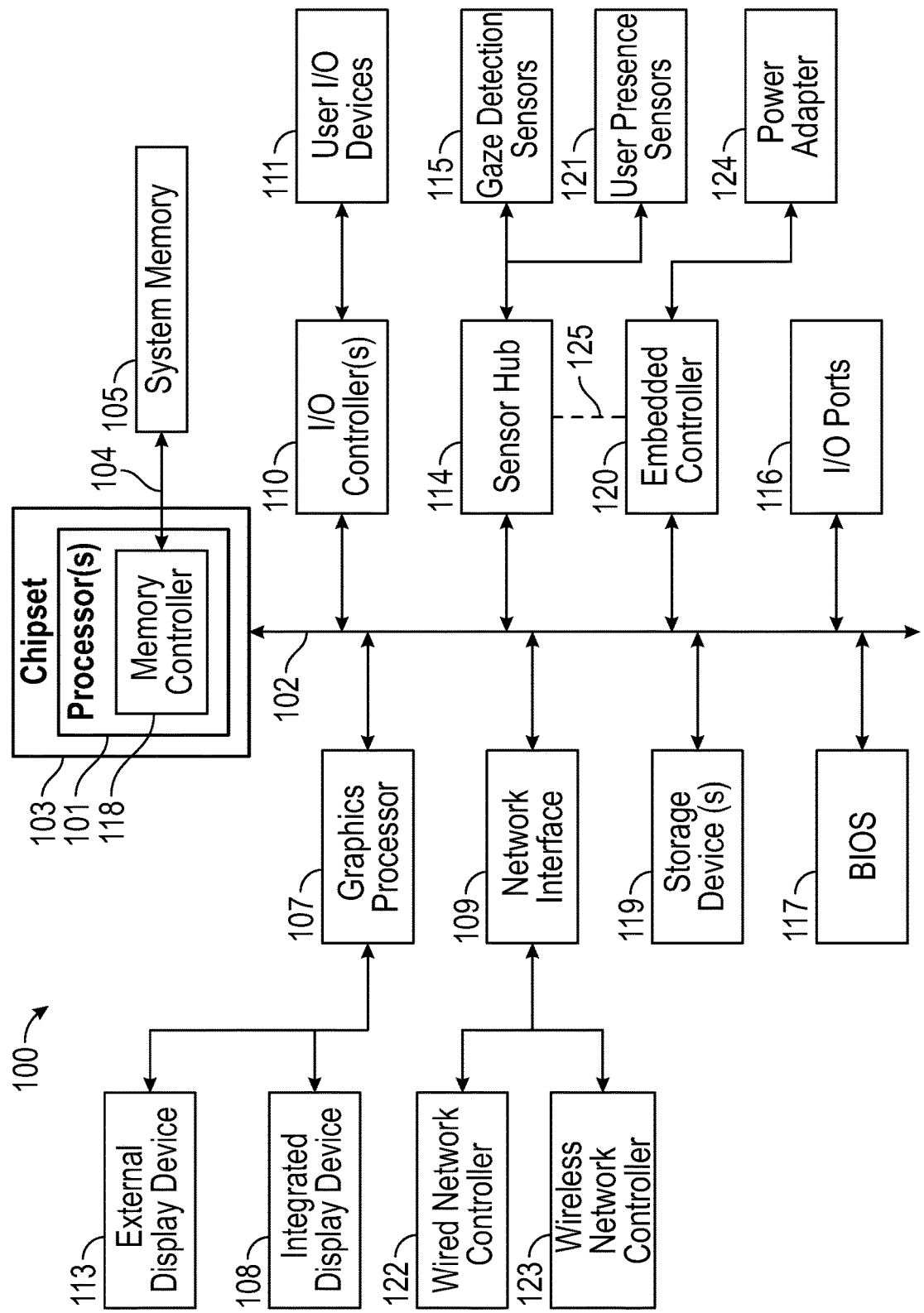
FIG. 1 is a block diagram depicting certain components of an IHS configured according to various embodiments for use with a keyboard supporting discrete haptic feedback areas.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of a personal computing device, other embodiments may be utilized.

FIG. 1 is a block diagram illustrating certain components of an IHS 100 configured according to certain embodiments for use with a keyboard supporting discrete haptic feedback areas. IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104. The system memory 105 that is coupled to processor 101 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, the system memory 105 may be comprised of multiple removable memory modules.

IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of separate buses to provide the illustrated pathways served by bus 102.

As illustrated, a variety of resources may be coupled to the processor(s) 101 of the IHS 100 through the chipset 103. For instance, chipset 103 may be coupled to a network interface 109 that may support different types of network connectivity. In certain embodiments, IHS 100 may include one or more Network Interface Controllers (NIC), each of which may implement the hardware required for communicating via a specific networking technology, such as Wi-Fi, BLUETOOTH, Ethernet and mobile cellular networks (e.g., CDMA, TDMA, LTE). As illustrated, network interface 109 may support network connections by wired network controllers 122 and wireless network controller 123. Each network controller 122, 123 may be coupled via various buses to the chipset 103 of IHS 100 in supporting different types of network connectivity, such as the network connectivity utilized by the operating system of IHS 100. In certain embodiments, network controllers 122 and/or 123 may utilize network I/O ports 116 for establishing network connections with external systems.

Chipset 103 may also provide access to one or more display device(s) 108, 113 via graphics processor 107. In certain embodiments, graphics processor 107 may be comprised within a video card, graphics card or within an embedded controller installed within IHS 100. In certain embodiments, graphics processor 107 may be integrated within processor 101, such as a component of a system-on-chip. Graphics processor 107 may generate display information and provide the generated information to one or more display device(s) 108, 113 coupled to the IHS 100. As provided above, an IHS may be operated by users by utilizing software applications such as video games. In such instances, graphics processor 107 may support operation of the video game through the creation of video game images that are rendered on one or more displays 108, 113 of the IHS 100. As described in additional detail below, in some embodiments, as part of the creation of such video game images, graphics processor 107 may be configured to detect the display of various types of haptic events within game play, such as explosions or the motion of projectiles. Also as described in additional detail below, some of these haptic events detected within the game play images generated by graphics processor 107 may trigger vibration and/or thermal haptic feedback in one or more haptic feedback areas of a keyboard palm rest. In some embodiments, graphics processor 107 may be further configured to determine a location of visual haptic events within gameplay, where such location information may be a location relative to a reference location within gameplay, such as the location of an avatar of the user of IHS 100. In some embodiments, graphics processor 107 may be further configured to classify haptic events, such as explosions, based on a geometric zone, such as a quadrant, of the display devices 108 and/or 113 in which the haptic event is displayed to the user.

The one or more display devices 108, 113 coupled to IHS 100 may utilize LCD, LED, OLED, or other display technologies. Each display device 108, 113 may be capable of receiving touch inputs such as via a touch controller that may be an embedded component of the display device 108, 113 or graphics processor 107, or may be a separate component of IHS 100 accessed via bus 102. In some embodiments, power to graphics processor 107, integrated display device 108 and/or external display 133 may be turned off, or configured to operate at minimal power levels, in response to IHS 100 entering a low-power state. As illustrated, IHS 100 may support an integrated display device 108, such as a display integrated into a laptop, tablet, 2-in-1 convertible device, or mobile device. IHS 100 may also support use of one or more external displays 113, such as external monitors and projectors that may be coupled to IHS 100 via various types of couplings, such as by connecting a cable from the external display 113 to an external I/O port 116 of the IHS 100.

Chipset 103 also provides processor 101 with access to one or more storage devices 119. In various embodiments, storage device 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109.

In various embodiments, 100 may include one or more I/O ports 116 the support removeable couplings with various types of peripheral external devices. For instance, I/O 116 ports may include USB (Universal Serial Bus) ports, by which a variety of external devices may be coupled to IHS 100. I/O ports 116 may include various types of physical I/O ports accessible to a user via the enclosure of the IHS 100, where these physical I/O ports support couplings that may connect IHS 100 with external devices and systems, such as couplings established with USB compatible devices via USB ports supported by IHS 100. In some embodiments, a keyboard supporting discrete haptic feedback areas may be coupled to IHS 100 via a I/O port 116 coupling, such as a USB coupling.

In certain embodiments, chipset 103 may utilize one or more I/O controllers 110 that may each support hardware components such as user I/O devices 111. For instance, I/O controller 110 may provide access to one or more user I/O devices 110 such as a keyboard, mouse, touchpad, microphone, speakers, camera and other input and output devices that may be coupled to IHS 100. Each of the supported user I/O devices 111 may interface with the I/O controller 110 through wired or wireless connections.

In supporting a keyboard with discrete haptic feedback areas, such as described herein, IHS 100 may utilize one or more device drivers in communicating haptic signals between processor 101 or an I/O controller 110 and the haptic keyboard. Such a device driver may include any instructions for the operation of haptic feedback modules located at various haptic areas of a keyboard. The device driver may also execute various other functions supported by the haptic keyboard. As described in additional detail below, haptic feedback modules supported according to embodiments may couple a mechanical feedback component, such as a piezoelectric actuator (PEA) and a thermal feedback component, such as a thermoelectric generator (TEG). In such embodiments, IHS 100 may utilize one or more PEA drivers and one or more TEG drivers for communicating haptic event feedback signals to the respective components of haptic feedback modules supported by a keyboard. For instance, based on the characteristics of haptic events detected during operation of a software program, such as a video game, on IHS 100, one or more haptic feedback modules supported by a keyboard may be selected and, based on the operation of these drivers, the mechanical actuator and the thermal generator may be activated and may be driven with voltages to generated both mechanical and thermal feedback at the selected locations.

As illustrated, IHS 100 also includes a BIOS (Basic Input/Output System) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. The BIOS 117 instructions may also load an operating system for use by the IHS 100. The BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI. In certain embodiments, the initialization of IHS 100 by BIOS 117 may be paused to allow for the validation of instructions utilized by a trusted component, such as a secure processor, in order to establish a hardware root of trust that includes the trusted component that may then be utilized to support certain secure operations of IHS 100, such as user authentication.

In some embodiments, IHS 100 may include a sensor hub 114 that collects information from various sensors of the IHS 100, such as user presence sensors 121 that may include optical, infrared and sonar sensors, that may provide data used by sensor hub 114 to provide an indication of a user's presence near IHS 100 and may also be used to determine a distance of a user from IHS 100. In some embodiments, such optical, infrared and sonar sensors may also be utilized by sensor hub 114 in supporting xR (virtual, augmented, mixed reality) sessions hosted by the IHS 100. In certain embodiments, sensor hub 114 may be configured to incorporate audio information in determining a user's presence near IHS 1000. For instance, sensor hub 114 may receive information from an audio I/O subsystem that includes ultrasonic audio transmission and reception capabilities. Based on such audio information, sensor hub 114 may determine, at least in part, a user's presence near IHS 100. In a similar manner, sensor hub 114 may also incorporate certain network signal information in determining a user's presence near IHS 100. For instance, sensor hub 114 may utilize the described BLUETOOTH transmission and reception capabilities of IHS 100 in order to detect a user's presence in proximity to IHS 100.

As indicated in FIG. 1, sensor hub 114 may also utilize gaze detection sensors 115 that may be used to determine the direction of a user's gaze. For instance, gaze detection sensors 115 may utilize a camera that captures high-frame-rate images of the user's eyes. In some instances, gaze detection sensors 115 may also project a pattern of infrared or (near-infrared) light on the user's eyes. Based on detected movement of the user's pupil relative to the projected pattern, gaze detection sensors 115 may determine a focus point of the user's gaze. Using this focal point determined by the gaze detection sensors 115, sensor hub 114 may determine whether the user is looking at the IHS 100.

In certain embodiments, sensor hub 114 may be an independent microcontroller or other logic unit that is coupled to the motherboard of IHS 100. In such embodiments, sensor hub 114 may communicate with various sensors and chipset 103 of processor 101 via a bus connection such as an Inter-Integrated Circuit (I2C) bus or other suitable type of multi-master bus connection. In certain embodiments, sensor hub 114 may be a component of an integrated system-on-chip incorporated into processor 101 and may utilize an I2C bus for communicating with sensors, such as the gaze detection sensors 115 and user presence sensors 121. Sensor hub 114 may collect and processes data from such sensors using data fusion techniques in order to determine contextual information regarding the operational state of IHS 100 for use in determining information to be distributed to participants in a collaborative session.

As illustrated, IHS 100 embodiments may utilize an embedded controller 120 that may be a motherboard component of IHS 100 and may include one or more logic units. In certain embodiments, embedded controller 120 may operate from a separate power plane from the main processors 101 and thus from the operating system functions of IHS 100. Firmware instructions utilized by embedded controller 120 may be used to operate a secure execution environment that may include operations for providing various core functions of IHS 100, such as power management, management of operating modes in which IHS 100 may be physically configured (e.g., determining a mode of a convertible laptop IHS based on the current hinge angle of the IHS reported by sensor hub 114) and support for certain integrated I/O functions. Embedded controller 120 may also implement operations for interfacing with a power adapter 124 in managing power for IHS 100. In certain embodiments, embedded controller 120 may be configured to place IHS 100 in a low-power state based on various conditions, such as based on a detected period of inactivity.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2:
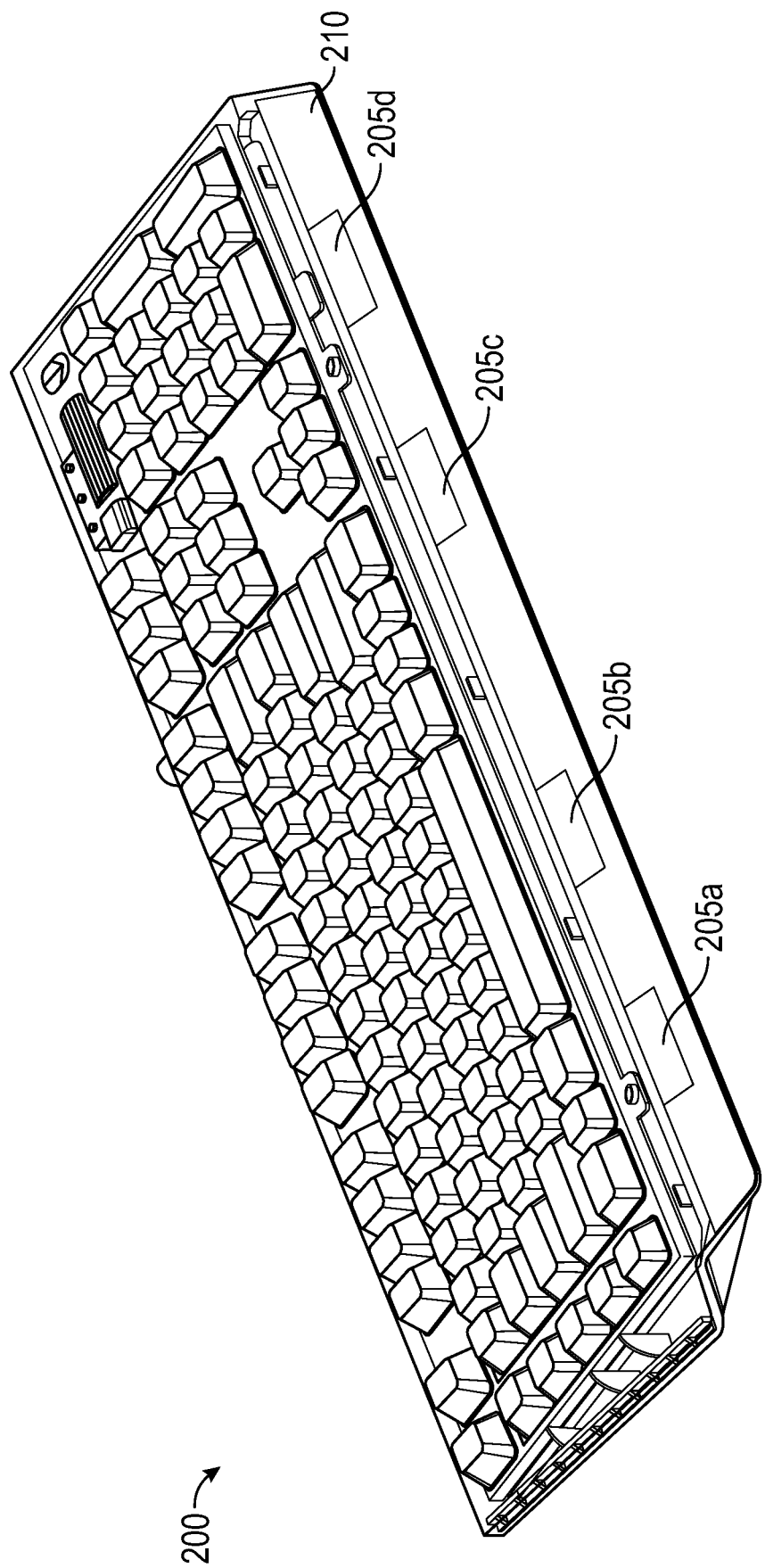
FIG. 2 is an illustration of a keyboard supporting discrete haptic feedback areas according to various embodiments.

FIG. 2 depicts an illustration of a keyboard 200 supporting discrete haptic feedback areas according to various embodiments. As described above, an external keyboard 200 may be coupled to various types of IHSs and may be utilized in the operation of various types of software applications, including video games. A keyboard 200 may include any number of mechanical keys that allow user to provide inputs to software applications operating on an IHS. During videogame play, such key entry inputs may support a variety of operations that may include a user typing words or commands, a user moving an avatar within a game space, and/or a user initiating various gameplay actions, such as shooting and changing objects in use by the avatar. During use of the keys of the keyboard 200 in this manner, a user's palms and other portions of the user's hands may rest on a palm rest 210 of the keyboard 200.

As illustrated, the keyboard 200 according to embodiments may include multiple haptic feedback areas 205a-d that are located along the length of the palm rest 210. Although four haptic feedback areas 205a-d are utilized in the embodiment of FIG. 2, other embodiments may utilize any number of haptic feedback areas that are distributed at various different locations along the palm rest of a keyboard. In the embodiment of FIG. 2, the haptic feedback areas 205a-d are rectangular in shape. Other embodiments may utilize haptic feedback areas that may be of various other geometries incorporated into the keyboard palm rest.

As described in additional detail below, each of the haptic feedback areas 205a-d may be independently operated to provide independent, multidimensional haptic feedback at each of the areas 205a-d and may be additionally operated to provide coordinated haptic feedback that spans multiple haptic feedback areas 205a-d. As illustrated with regard to the below embodiments, each of the haptic feedback areas 205a-d may provide haptic outputs using a respective haptic feedback module that is installed within the keyboard palm rest 210. Each haptic feedback module may support both mechanical feedback as well as thermal feedback at each of the respective haptic feedback areas 205a-d. For instance, based on the operation of a haptic feedback module installed at area 205a of the palm rest 210, thermal and vibration feedback may be simultaneously or separately generated at area 205a. The haptic feedback modules installed at areas 205b-d may be similarly operated to provide thermal and mechanical feedback at one more of the feedback areas 205a-d.

As described in additional detail below, the haptic feedback that is generated at each of the areas 205a-d may be tied to events detected within the operation of a software application, such as a videogame, in which keyboard 200 is being utilized. Based on haptic events detected within the gameplay, haptic feedback may be generated at one or more of the haptic feedback areas 205a-d. In some instances, the haptic feedback may include the operation of a single haptic feedback module. For example, in response to detecting an explosive visual event in gameplay, where the event is determined to be located to the left of the user's avatar, the haptic feedback module at area 205a may be operated to generate a burst of vibration feedback and a burst of heat on the user's left hand. In some instances, the haptic feedback may include the operation of multiple haptic feedback modules. For example, in response to detecting a large explosive event in gameplay that is located very near to the user's avatar, the haptic feedback modules at all of the areas 205a-d may be operated to generate bursts of vibration and heat at all of the respective areas 205a-d. In some instances, the amplitude and duration of the bursts that are generated by each of the haptic feedback modules may be varied according to the position of the user's avatar relative to the location and size of the haptic event that is triggering the feedback. In other instances, the haptic feedback modules at areas 205a-d may be each operated to generate bursts of vibration and heat in coordination with haptic feedback modules at neighboring areas, in some cases coordinated in a manner that relates a sense of motion of a haptic event detected within gameplay. For example, in response to detecting a burst of explosive movement traveling from left to right relative to the user's avatar, a burst of heat and vibration may be generated at location 205a, followed by a burst of heat and vibration generated at location 205b, which is followed by successive bursts of heat and vibration at location 205c, and then at location 205d. In some instances, the time delay between the bursts of haptic feedback at neighboring locations may be selected to correspond to the speed of the detected explosive event. In this manner, fast-moving explosive events detected during gameplay may correspond to a rapid sequence of haptic bursts at each of the areas 205a-d of the palm rest 210, while a slower moving explosive event may correspond to a slower sequence of haptic bursts at each of these areas 205a-d.

Figure 3A:
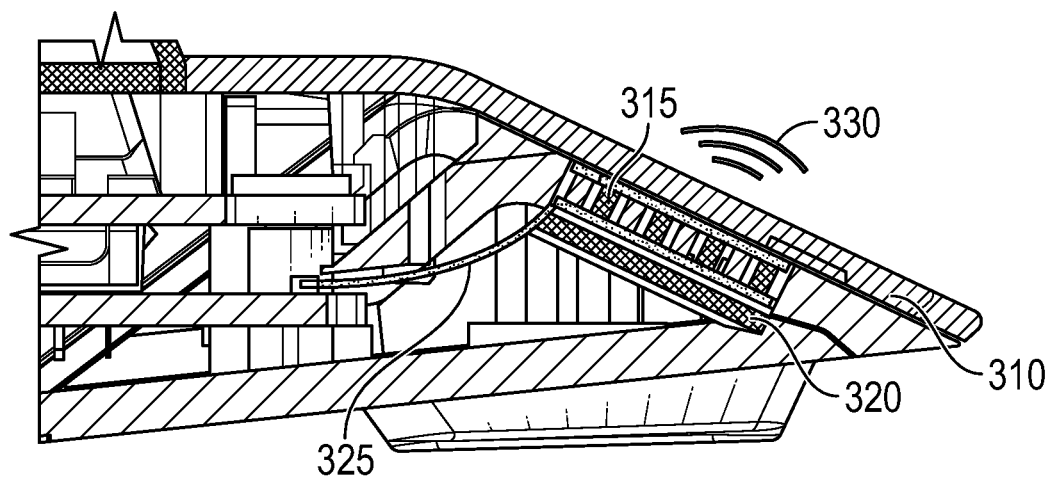
FIG. 3A is a cross-section illustration of an integrated keyboard palm rest supporting discrete haptic feedback areas according to various embodiments.

FIG. 3A is a cross-section illustration of an integrated keyboard palm rest supporting discrete haptic feedback areas according to various embodiments. Similar to the keyboard of FIG. 2, the keyboard of FIG. 3A includes an integrated palm rest 310 on which various parts of a user's hands may rest while operating the keys of the keyboard. In the cutaway view of FIG. 3A, a side view of a haptic feedback module is provided. As described, haptic feedback modules according to embodiments support multidimensional haptic feedback that includes both mechanical and thermal feedback. Accordingly, the haptic feedback module of FIG. 3A includes a mechanical actuator 320 that is capable of generating mechanical outputs, such as vibrations and clicks. In some embodiments, the mechanical actuator 320 may be a piezoelectric actuator (PEA) that converts an applied voltage to mechanical outputs. The haptic feedback module of FIG. 3A also includes a thermal generator 315 that may be capable of generating both heat and cooling sensations. In some embodiments, the thermal generator 315 of a haptic feedback module may be a thermoelectric generator (TEG) that uses an applied voltage to either absorb or emit heat.

As illustrated, the haptic feedback module that is formed from the mechanical actuator 320 and the thermal generator 315 may be coupled to circuitry of an IHS via one or more wires 325. Using signaling pathways and/or power delivery pathways provided by wires 325, one or more drivers running on an IHS may be used to activate and operate the haptic feedback module, such as described with regard to the IHS of FIG. 1. Operated in this manner, the mechanical actuator 320 and the thermal generator 315 may be separately or simultaneously used to generate haptic feedback 330 at a location on the palm rest 310 under which the haptic feedback module is installed. As described above, such haptic feedback modules may be installed at locations along the length of the palm rest 310 and may be operated separately or simultaneously, and in some cases in a coordinated manner.

Figure 3B:
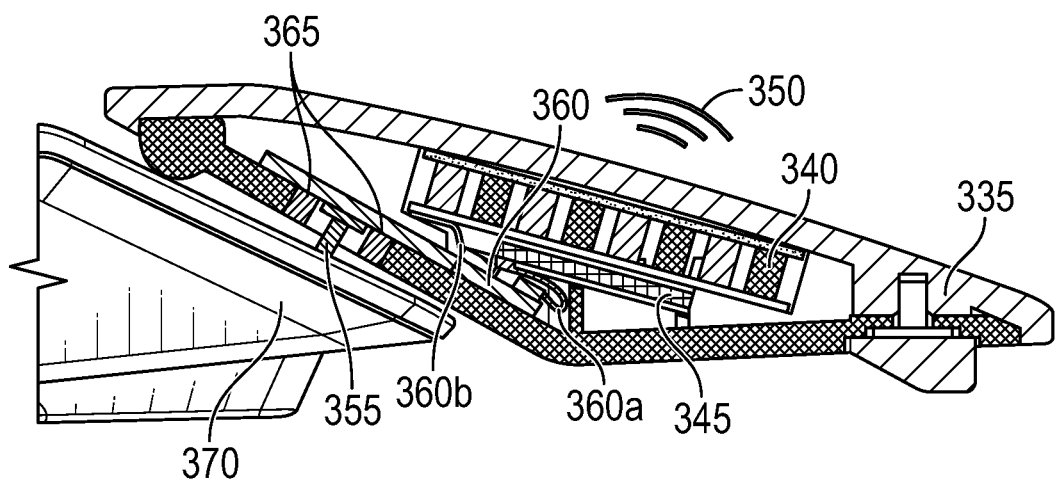
FIG. 3B is a cross-section illustration of a detachable keyboard palm rest supporting discrete haptic feedback areas according to various embodiments.

FIG. 3B is a cross-section illustration of a detachable keyboard palm rest 335 supporting discrete haptic feedback areas according to various embodiments. Whereas the integrated palm rest of FIG. 3A is part of the keyboard itself, the detachable palm rest 335 may be attached and detached from an integrated palm rest 370, where the integrated palm rest 370 may be an integrated palm rest of an external keyboard, or may be an integrated palm rest of a laptop computer. As illustrated in FIG. 3A, the detachable palm rest 335 may be coupled to an integrated keyboard 370 by inserting a pin 355 that extends from the detachable palm rest 335 and is received by a corresponding receptacle of the integrated palm rest 370. In some embodiments, the pin 335 may be received by a corresponding port of the integrated palm rest 370. In some embodiments, the pin 335 may be a spring-loaded pogo pin that may be received by a metal surface, such as a concave or flat area, of the integrated palm rest 370. In such embodiments, the detachable palm rest 335 may be held against the integrated palm rest 370 by magnets 365 that are incorporated within the detachable palm rest 335 and that may be magnetically coupled to corresponding magnets of the opposite polarity that are installed within the integrated palm rest 370.

As described above, electrical signals may be generated by an IHS and transmitted to haptic feedback modules incorporated at multiple locations within keyboard palm rest embodiments. In some instances, such electrical signals generated by an IHS may include signals to activate and configure the feedback by a module and may also include transmissions of power that are converted to haptic feedback by the mechanical actuator and thermal generator of a haptic feedback module. In some instances, such electrical signals generated by an IHS may include command signals that are received by integrated circuitry of the haptic feedback module, which draws power as needed in order to generate the haptic feedback specified by the command signals. In the embodiment of FIG. 3A, electrical signals that may include power and/or command signals generated by the IHS for the operation of the haptic feedback module are transmitted along wire 325. In the embodiment of FIG. 3B, electrical signals that may also include power and/or commands may be transmitted via a coupling established by the coupling of pin 355 to a receptacle of the integrated palm rest 370. In some embodiments, electrical signals that may include power and/or commands may be transmitted to a detachable palm rest 335 via a wireless coupling between a transceiver of the detachable palm rest 335 and the IHS.

As with the integrated palm rest of FIG. 3B, the detachable palm rest 335 includes an inner cavity in which a haptic feedback module is installed. Also as with the integrated palm rest, the haptic feedback module in the detachable palm rest 335 may include a thermal generator 340, such as a TEG, that is stacked on top of a mechanical actuator 345, such as a PEA. Based on commands and/or power received from the IHS, the mechanical actuator 345 and the thermal generator 340 may be separately or simultaneously activated and used to generate haptic feedback 335 at a location on the detachable palm rest 335 under which the haptic feedback module is installed. As described, power and/or command signals may be transmitted to detachable palm rest 335 from an IHS using a communication pathway established via pin 355 or via a wireless coupling. Such power and/or commands may be received by components of a printed circuit board 360 installed within a cavity of the detachable palm rest 335. Power may then be delivered to thermal generator 340 via electrical lead 360b and/or to mechanical actuator 345 via lead 360a in order to generate thermal and/or mechanical feedback 350 on the surface of the detachable palm rest 335. As described above, multiple haptic feedback modules may be installed at locations along the length of the detachable palm rest 335 and may be operated in this manner separately or simultaneously, and in some cases in a coordinated manner.

Figure 4A:
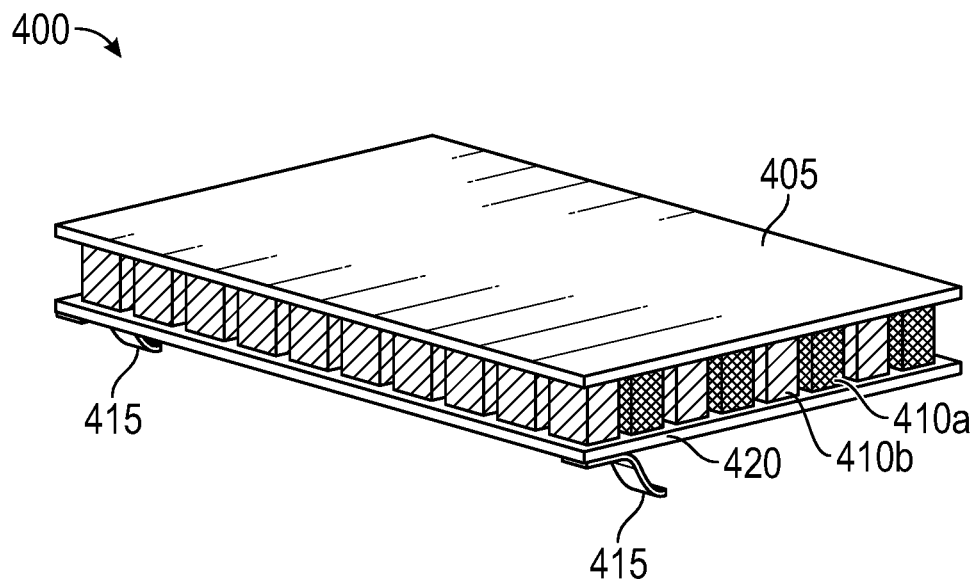
FIG. 4A is an illustration of a haptic feedback module used to generate thermal outputs.

FIG. 4A is an illustration of a haptic feedback module used to generate thermal outputs. In particular, FIG. 4A illustrates a thermoelectric generator (TEG), such as described above, that is capable of generating both heating and cooling haptic feedback outputs. In the illustrated embodiments, TEG 400 is constructed from a top heating and cooling plate 405 and a bottom base plate 420, where both plates 405, 420 may be electric insulators, such as ceramics. The material used for the top heating and cooling plate 405 may be further selected to promote thermal conduction between pairs of semiconductors 410a-b and any portion of the user's hands or fingers that are on or near the top plate 405 that may be exposed via openings at locations along a keyboard palm rest, such as described with regard to FIG. 2.

As indicated in FIG. 4A, pairs of p-doped 410a and n-doped 410b semiconductors may be stacked between the top and bottom plates 405, 420 of TEG 400. Although two electrical leads 415 are illustrated in FIG. 4A, any number of electrical leads may be used to deliver and route power to individual pairs or semiconductors 410a-b that are stacked within the plates 405, 420 of the TEG 400. Based on voltages applied on leads 415, pairs of semiconductors 410a-b may be activated to either heat or cool the top plate 405, where the magnitude of the heating or cooling that is generated may vary based on the magnitude of the voltage that is applied. TEG 400 may be operated in this manner to generate a cooling sensation using the Peltier effect and to generate a heating sensation using the Seebeck effect. Changes in the temperature of top plate 405 may be generated through the application of voltages on pairs of p-doped and n-doped semiconductors 410a-b. Through exposed openings in the keyboard palm rest, the thermal changes in top plate 405 may be felt by the user's hands, thus providing a heating or cooling sensation in a particular area of the keyboard palm rest.

In certain embodiments, each pair of semiconductors 410a-b may be operated independently based on the voltages that are applied on leads 415. In addition to being operated independently, each pair of semiconductors 410a-b may be operated along with any number of other pairs of semiconductors that are wired in the same circuit as semiconductors 410a-b. Any number of circuits of semiconductors may be stacked within a single top and bottom cooling plate 405, 420, which each circuit may be separately operated via separate electrical leads. Accordingly, any combination of the pairs of semiconductors 410a-b of TEG 400 may be individually addressed to generate thermal feedback on all or any portion of heating and cooling plate 405. As described above, thermal generators may be located as part of haptic feedback modules at various locations along the length of a keyboard palm rest. Based on events detected during gameplay, thermal generators, such as TEG 400, may be operated to provide thermal feedback at one or more locations on the palm rest, with the thermal feedback at each separate TEG configurable to heat or cool any portion of each respective top plate 405, where such thermal outputs of TEG 400 may be felt by the user through an opening in the palm rest.

Figure 4B:
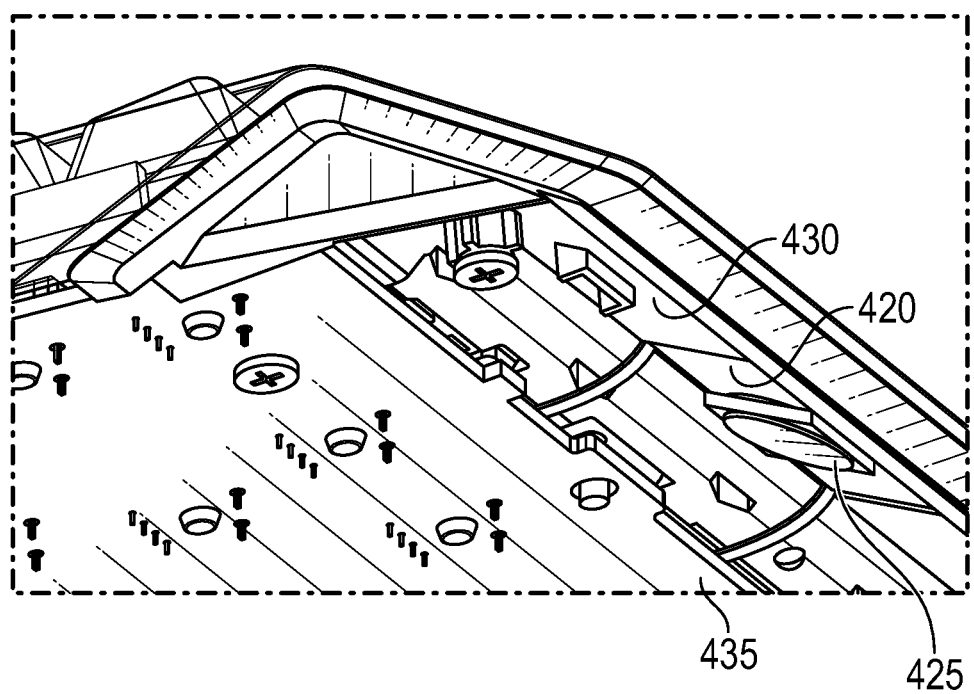
FIG. 4B is a bottom-view illustration a haptic feedback module attached to a top surface of an integrated keyboard palm rest according to embodiments.

FIG. 4B is a bottom-view illustration a haptic feedback module attached to a top surface of an integrated keyboard palm rest according to embodiments. As described with regard to FIGS. 2A and 2B, a haptic feedback module may consist of thermal generator stacked on top of a mechanical actuator. The illustration of FIG. 4 shows the bottom view of a cavity below the palm rest of a keyboard. Within an opening in the bottom of palm rest 430, a mechanical actuator 425 can be seen attached to the bottom plate 420 of a thermal generator, such as the TEG of FIG. 4A. In some embodiments, actuator 425 may be attached directly to the bottom plate 420 of the TEG and, in other embodiments, actuator 425 may be pressed against the bottom plate 420 during manufacturing of the palm rest using structures provided within the bottom cover of the palm rest, such as described with regard to FIG. 4C. When a voltage is applied to mechanical actuator 425, it may generate a vibration, click or other mechanical effect that may be felt by the user through the thermal generator and that may also be felt through a portion of the palm rest itself.

In some embodiments, mechanical actuator 425 may be a piezoelectric actuator (PEA) the converts electrical inputs to mechanical outputs. In particular, a PEA may include one or more piezoelectric layers that expand when a voltage is applied to these layers. When such a voltage is removed, the piezoelectric layer shrinks back to a rest state. The expansion and contraction of the piezoelectric layer of a PEA resulting from the application of a voltage creates a vibration, click, or other mechanical sensation that may be felt by the user. As described, mechanical actuators 425 may be installed as a part of a haptic feedback module at various locations along the length of a keyboard palm rest. Based on events detected during gameplay, mechanical actuators 425, such as a PEA, at each of these haptic feedback locations on the palm rest may be operated to provide mechanical feedback, with the mechanical feedback at each actuator 425 being configurable to generate varying levels of mechanical feedback at each haptic feedback location of the palm rest.

In the embodiments of FIGS. 3A, 3B and 4B, a thermoelectric generator is stacked above a mechanical actuator. However, other embodiments may utilize other physical arrangements of thermoelectric generators and mechanical actuators. For instance, rather than being stacked below a thermoelectric generator, one or more mechanical actuators may be placed along a side of a thermoelectric generator. For instance, mechanical actuators may be located to the left or right of a thermoelectric generator and may be fixed within the cavity of the palm rest in the same manners as the thermoelectric generators. In some embodiments, multiple mechanical actuators may be placed at various locations around a thermoelectric generator. For example, dual mechanical actuators may be located on each side of a thermoelectric generator. In another example, four mechanical actuators may be equally spaced at locations surrounding a thermoelectric generator. In these additional embodiments, one or more mechanical actuators may be operated in conjunction with a thermoelectric generator in order to generate multi-dimensional haptic feedback that relays positional information detected within a software application, in the same manner as the stacked configurations described with regard to FIGS. 3A, 3B and 4B.

Figure 4C:
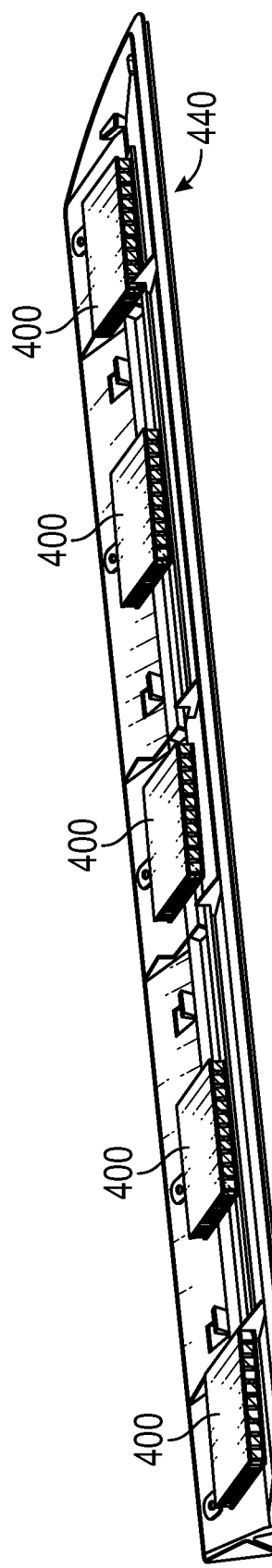
FIG. 4C is a top-view illustration of a set of five haptic feedback modules installed within cavities of a bottom portion of a keyboard palm rest according to embodiments.
Figure 4D:
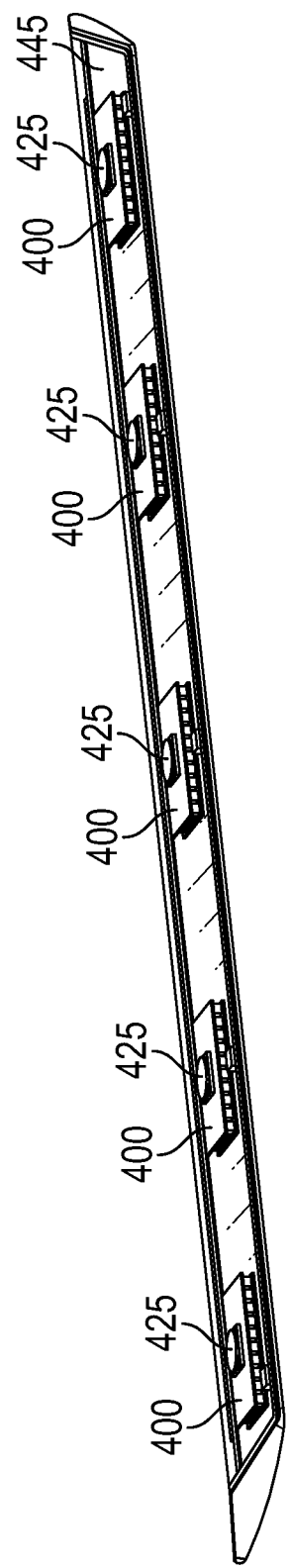
FIG. 4D is a bottom-view illustration of a set of five haptic feedback modules attached to the top portion of a keyboard palm rest according to embodiments.

FIG. 4C is a top-view illustration of a set of five haptic feedback modules installed within cavities of a bottom portion 440 of a keyboard palm rest according to embodiments. As described, a haptic feedback module according to embodiments may consist of a mechanical actuator installed beneath a thermoelectric generator. FIG. 4D is a bottom-view illustration of a set of five haptic feedback modules attached to the top portion 445 of a keyboard palm rest according to embodiments. In FIG. 4C, five thermoelectric generators 400, such as the TEG of FIG. 4A, are installed at locations along the length of a palm rest. The thermoelectric generators 400 are installed within a cavity of the bottom portion 440 of a palm rest. Although not visible in FIG. 4C, a mechanical actuator is installed below each of the thermoelectric generators 400. In some embodiments, the thermoelectric generators 400 may each be fixed to a mechanical actuator below it, and the mechanical actuator may be fixed to structures of the bottom portion 440 of the palm rest, such as illustrated in the cutaway illustration of FIG. 3B. In some embodiments, the thermoelectric generators 400 may be separately fixed to the structures of the bottom portion 440 of the palm rest, without being fixed directly to the mechanical actuator below the thermoelectric generator.

In this manner, each haptic feedback module may be installed at a location along the length of the palm rest. Assembly of the palm rest may then continue with a top portion of the palm rest being fixed to the bottom portion 440, where the top portion includes openings that correspond to each of the top plates of the thermoelectric generators. In the illustrated embodiments, the top plates of the thermoelectric generator are rectangular in shape, but other embodiments may utilize thermoelectric generators with top plates of various other geometries. Accordingly, the top portion of the palm rest may include various geometries of openings by which the thermoelectric generators 400 are exposed on the top surface of the palm rest. In some embodiments, the top plate of the thermoelectric generator 400 may not be exposed directly to the user via the openings of the top portion of the palm rest. For instance, the openings in the top portion of the palm rest may be covered by a film or sheet of material that promotes thermal outputs from the thermoelectric generator 400 while protecting the top plate of the generator from damage.

In FIG. 4D, haptic feedback modules are shown attached to the underside of the top portion 445 of a palm rest, where each haptic feedback module includes a mechanical actuator 425 fixed to the bottom plate of a thermoelectric generator 400. Whereas in FIG. 4C, the haptic feedback modules are installed by fixing them to structures of the bottom portion of the palm rest, in the embodiment of FIG. 4D, the haptic feedback modules are affixed to the top portion 445 of the palm rest. For instance, during manufacture of the palm rest of FIG. 4D, each haptic feedback module may snapped into place within retaining structures formed on the underside of the top portion 445 of the palm rest. Such retaining structures of the top portion 445 of the palm rest may be positioned such that when they receive a haptic feedback module, the top plate of the thermoelectric generator 400 is located within an opening provided in the top portion 445 of the palm rest. Via this opening, the haptic feedback generated by the module may be felt by the hands of the user, where the openings of the top portion 445 of the palm rest may include protective sheets that protect the top plate of the thermoelectric generator from being damaged. Once the haptic feedback modules have been fixed to the top portion 445 of the palm rest, assembly of the palm rest may continue by attaching the top portion 445 of the palm rest to a bottom portion, where the bottom portion includes a cavity in which the haptic feedback modules are located, such as illustrated with regard to FIGS. 3A and 3B.

Figure 5:
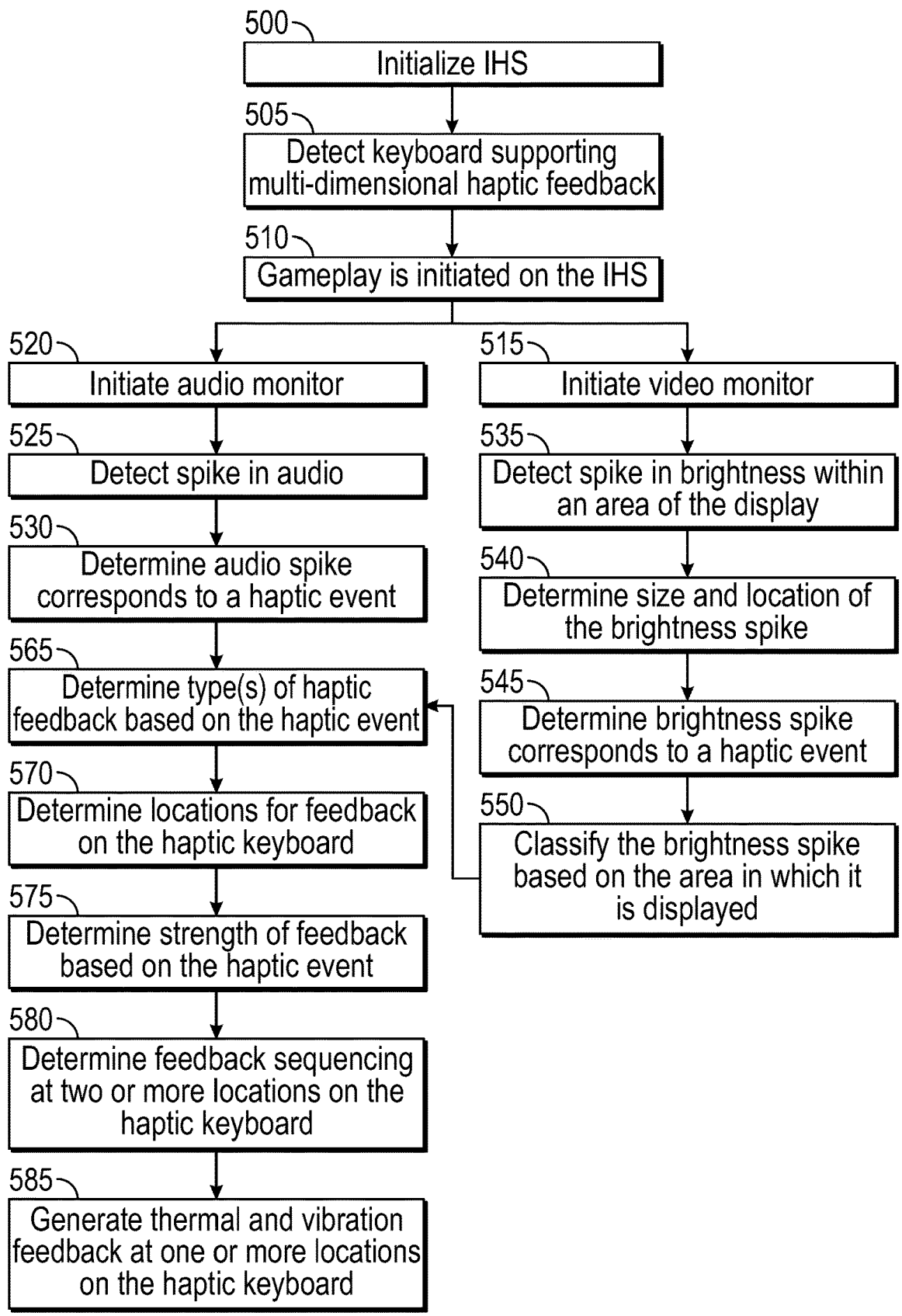
FIG. 5 is a flowchart diagram illustrating certain steps of methods according to embodiments for the operation of a keyboard supporting discrete haptic feedback areas.

FIG. 5 is a flowchart diagram illustrating certain steps of methods according to embodiments for the operation of a keyboard supporting discrete haptic feedback areas. Some embodiments may begin, at block 500, with the initialization of an IHS, such as described with regard to FIG. 1. In various scenarios, the IHS may be initialized from various power states that may range from fully off to various intermediate and low-power states. As part of the initialization procedures of the IHS, at block 505, a haptic keyboard, such as described herein, is detected as being coupled to the IHS. In some embodiments, the keyboard may include a controller or integrated circuit that identifies the haptic keyboard and its capabilities. In some embodiments, the IHS may be configured to interrogate the specific capabilities and configurations supported by the haptic keyboard through signaling each of the haptic feedback modules that are detected within the haptic keyboard. Based on such interrogations and/or capability information provided by the keyboard, the IHS may be configured to operate the various haptic feedback modules that are detected within the palm rest. As described with regard to FIG. 1, drivers may operate within the operating system of IHS or on a controller of the IHS, where such drivers provide capabilities for generating haptic feedback through application of a voltage to a haptic feedback module.

With the operation of the haptic keyboard configured during initialization of the IHS, the user may commence operation of the IHS and may thus operate a wide variety of software applications through an operating system of the IHS. At block 510, the user initiates operation of a software program, such as a videogame, for which the described haptic feedback capabilities are supported. As described, videogames may include various events, for which haptic feedback may be generated in order to enhance the user's gameplay. For example, in a first-person videogame, a user's avatar may be located within a game space in which an explosive event may occur, such as a bomb exploding, a plane crashing, a car wrecking, or a special power being used by a videogame character. In response to such events within videogame play, haptic feedback is supported by embodiments in which multiple dimensions of feedback may be provided, where the feedback provides the user with a sense of the avatar's distance from the explosive event and the direction from which the explosive event would be felt by the avatar.

As described above, embodiments utilize a palm rest that includes multiple haptic feedback locations at which both mechanical feedback and thermal feedback may be generated. In gameplay scenarios in which an explosive event is detected, embodiments support providing thermal feedback that varies in magnitude according to the distance of the user's avatar from the explosive event and also in which the direction of the explosive event from the user's avatar may be reflected in the thermal feedback. For example, an explosion that is relatively far away from the user's avatar results in smaller amounts of heat from the thermal generators, while the same sized explosion that is close to the user's avatar results in a significantly greater amount of heat from the thermal generators, thus providing the user with thermal feedback that relates the avatar's distance from the explosive event. Directional information may be provided through the selection of haptic feedback locations on the palm rest to operate and through the sequencing of their operation. For instance, an explosive event detected at a close proximity directly in front of the user's avatar may result in an equal and simultaneous thermal feedback output at all of the haptic feedback locations of the palm rest. However, in explosive event detected to the left of the user's avatar may result in thermal feedback only on the left side of the palm rest, with the amount of heat provided as feedback at each location selected to convey the distance of the explosive event from the user's avatar.

In many instances, an explosive event that occurs within gameplay may include motion. For instance, a projectile may be launched at the user's avatar such that it crosses from one side of the avatar to the other. Other objects, such as aircraft and flashes of light resulting from the use of special powers by gameplay characters, may similarly cross from one side of the user's avatar to the other. In providing the user with directional haptic feedback, embodiments support capabilities for sequencing the operation of the thermal feedback generators at each location of a palm rest in order to relay the direction and movement of the explosive event from the user's avatar. For example, when an explosive event is detected moving from the left of the user's avatar to the right of the user's avatar, the leftmost thermal generators on the palm rest may be activated first. Moving towards the right of the palm rest, successive neighboring thermal generators may be activated after some time delay from the preceding thermal generator. The amount of heat that is generated at each location may be selected to reflect the distance of the moving explosive event at corresponding points in its movement from the avatar's left to its right, such that more heat is generate at locations where the moving event is closest to the avatar. The delay between engaging successive neighboring thermal generators may be selected according to the velocity of the motion of the explosive event, such that a slower moving event will result in a slow progression of thermal output across each of the haptic feedback locations and a fast-moving event will result in a rapid progression of thermal outputs along the length of the palm rest.

In this same manner in which embodiments may support various dimensions of thermal feedback, embodiments may additionally support providing mechanical feedback at each of the haptic feedback locations of the palm rest. For instance, the explosive event detected far away from the user's avatar results in lower levels of vibration feedback in comparison to the same sized explosive event detected near the user's avatar. An explosive event that is located directly in front of the user's avatar may result in equal and simultaneous vibration feedback at all haptic feedback locations when the event is located close to the avatar, and may result in simultaneous vibration feedback at locations along the center of the palm rest when the event is located further from the avatar. As with the described thermal feedback, the direction of an explosive event from the user's avatar may be reflected in the selection of mechanical actuators of the palm rest that are activated. For instance, an explosive event detected to the left of the user's avatar results in activation of the mechanical actuators on the left side of the palm rest, with the strength of generated vibrations by each actuator selected based on the distance of the explosive event from the avatar. Also as with the described thermal feedback, movement of an explosive event may be reflected in the sequencing of the operation of mechanical actuators. For instance, when an explosive event is detected crossing from the left of the user's avatar to the right of the avatar, vibration feedback may be initiated on the left side of the palm rest and may progress in various strengths from left to right across each of the mechanical actuators of the palm rest, with the various strengths and speed of this progression of mechanical actuations correlated to the velocity of the movement of the explosive event relative to the avatar.

Some embodiments may also support providing visual feedback at haptic feedback locations of the palm rest. In such embodiments, LED (light emitting diodes) or other lights may be incorporated into a haptic feedback module or may be installed in proximity to the module, where the LED may generate light that is visible to the user via a translucent or opaque portion of a palm rest. When activated, an LED may generate one or more colors of light at varying levels of brightness. The brightness and colors may be selected based on characteristics of a detected haptic event. For instance, the explosive event detected far away from the user's avatar results in dimmer visual outputs in cooler colors in comparison to LED outputs generated for the same sized explosive event detected near the user's avatar. An explosive event that is located directly in front of the user's avatar may result in equal and simultaneous bright light in warm colors at all haptic feedback locations when the event is located close to the avatar, and may result in dimmer light of cooler colors at locations along the center of the palm rest when the event is located further from the avatar. As with the described thermal and mechanical feedback, the direction of an explosive event from the user's avatar may be reflected in the selection of LEDs of the palm rest that are activated. For instance, an explosive event detected to the left of the user's avatar results in activation of LEDs on the left side of the palm rest, with the brightness of each LED selected based on the distance of the explosive event from the avatar. Movement of an explosive event may be reflected in the sequencing of the operation of the LEDs. For instance, when an explosive event is detected crossing from the left of the user's avatar to the right of the avatar, LED outputs may be initiated on the left side of the palm rest and may progress at various levels of brightness from left to right across each of the haptic feedback locations of the palm rest, with the progression of brightness levels and the speed of this progression correlated to the velocity of the movement of the explosive event relative to the avatar.

In supporting such multidimensional haptic feedback at various locations along the length of a palm rest, embodiments may utilize software procedures that detect haptic events occurring within videogame play. Accordingly, at block 520, an audio monitor may be initiated in order to detect explosive audio events occurring within gameplay and, at block 515, a video monitor may be initiated in order to detect explosive visual events occurring within gameplay. With gameplay ongoing, at block 525, the audio monitor detects a spike in the audio output of the videogame. In some embodiments, the audio monitor may detect such spikes through operation on an audio controller of an IHS, where the audio monitor tracks the amplitude of the audio output generated by the audio controller and identifies deviations in amplitude that are above a certain threshold. In some embodiments, the audio monitor may detect such spikes through the operation of an audio driver of the operating system of the IHS that is configured to provide amplitude and/or volume information from which spikes in audio may be detected. Through the identification of such audio spikes, embodiments are able to distinguish between explosive audio events from changes in volume level, thus providing the ability to distinguish between a projectile exploding near the avatar from a user's avatar simply entering a noisy room.

Upon detecting a spike in the audio output during gameplay, at 530, embodiments determine whether the spike corresponds to a haptic event. In some embodiments, audio spikes may be designated as haptic events only when rising above a certain volume threshold or only when determined to occur during an ongoing explosive visual event. Audio spikes may also be designated as haptic events based on the relative level of audio outputs that are occurring during the gameplay. During quiet intervals with little audio, such as when the user's avatar is located in a quiet area of the game space, smaller deviations may be designated as haptic events, while larger deviations are required for designation as haptic events during more noisy intervals of gameplay, such as when a user's avatar is participating in a combat scenario. Upon detecting an explosive audio event that is designated as a haptic event, embodiments may proceed to generate thermal and/or mechanical feedback at one or more of the haptic feedback locations along the palm rest. However, when the explosive audio event is detected in conjunction with an explosive visual event, the haptic feedback generated at locations along the palm rest may be determined based on the characteristics of both the explosive audio event and the explosive visual event.

As described above, at block 515, a video monitor may be initiated for use in detecting explosive visual events during gameplay. In some embodiments, the video monitor may be implemented through operations of a video controller of an IHS that generates images for display. In some embodiments, the video monitor may alternatively or additionally be implemented through operations of a video driver of the operating system of the IHS. Through the operation of the video monitor, at block 535, spikes in the brightness are identified in the generated images, where such spikes in brightness may be localized to a defined area of the portion of the game space that is currently being displayed through the generated images. Spikes in brightness may be identified as display areas that deviate in brightness from surrounding areas.

Once a spike in brightness has been detected, at 540, the size and location of the brightness spike may be determined. In some embodiments, the size of the brightness spike may be determined relative to the size of the current game space in which the user's avatar is located. Embodiments may also determine the size of the brightness spike relative to the size of the image that is currently being displayed. Embodiments may also determine the size of the brightness spike relative to the size of the user's avatar. The location of the brightness spike may be determined relative to the position of the user's avatar, where the determined location provides a distance and bearing to the brightness spike from the avatar's location.

At block 545, embodiments determine whether the brightness spike corresponds to a haptic event. In some embodiments, brightness spikes may be designated as haptic events only when rising above a certain brightness threshold or only when determined to occur during an ongoing explosive audio event. Brightness spikes may also be designated as haptic events based on the relative level of brightness in the images that are currently being displayed. In dark areas, such as when the user's avatar is located in a dark building of the game space, smaller deviations in brightness may be designated as haptic events, while larger brightness deviations are required for designation as haptic events during more visually noisy intervals of gameplay, such as when a user's avatar is participating in a combat scenario.

Figure 6:
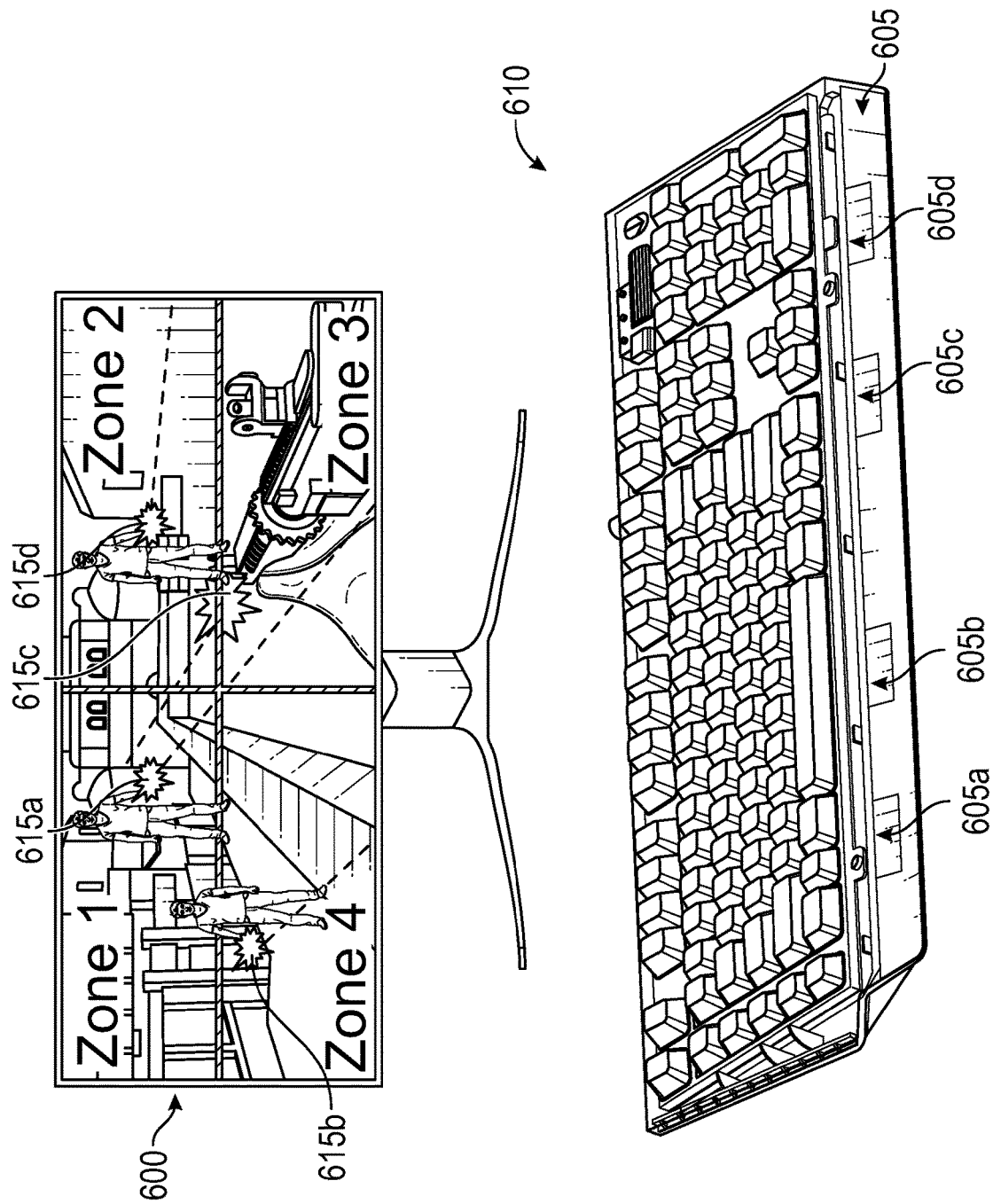
FIG. 6 is an illustration of a display and keyboard supporting discrete haptic feedback areas according to various embodiment.

Some embodiments may continue, at block 550, with the classification of the identified brightness spike based on the area in which the brightness spike is displayed to the user. As illustrated in FIG. 6, a display 600 may be logically divided into multiple zones. Embodiments may logically divide a display into various numbers of zones and into zones of various different geometries. In FIG. 6, the display 600 is divided into four quadrants, where each quadrant corresponds to a zone in which brightness spikes may occur. Based on the size and location of the brightness spike, the spike may be classified according to the zone of the display in which it occurs. For example, brightness spike 615*a* may be identified as described above and based on its location, brightness spike 615*a* may be classified as occurring in Zone 1 of display 600. Similarly, brightness spike 615*b* may be identified and classified as occurring in Zone 4 of display 600. In some instances, a brightness spike may span multiple zones of a display. For instance, brightness spike 615*c* spans Zone 2 and Zone 3 of display 600.

In some embodiments, such zone classifications may be extended to classify the movement of certain explosive visual events. In a scenario where each of the brightness spikes 615a-d are in motion along the trajectories indicated in FIG. 6, each of the brightness spikes may be further classified according to the zones through which the brightness spike travels. For instance, brightness spike 615b may be a projectile launched at the user's avatar and that remains in Zone 4 is to the left of the avatar during its movement. Brightness spike 615d similarly travels solely within Zone 2 and remains to the right of the user's avatar, but at a further distance from the avatar when compared to the movement of brightness spike 615b in Zone 4. As illustrated, brightness spike 615a originates in Zone 1 and crosses from the left of the user's avatar into Zone 3 to the right of the user's avatar, such that the projectile corresponding to brightness spike 615a originates far from the avatar and terminates very near the avatar. Based on such displayed zone classifications for the location and movement of identified brightness spikes, locations and sequencing of haptic feedback at locations 605a-d of keyboard 610 may be determined.

Returning to FIG. 5, at block 565, the types of haptic feedback to be provided may be determined for the haptic events that have been identified based on a brightness spike and/or an audio spike. In some instances, brightness and audio spikes may coincide, such as due to an explosive event occurring within gameplay. In other instances, brightness and audio spikes may occur independently. In scenarios where brightness and audio spikes coincide, both mechanical and thermal haptic feedback may be selected for application at haptic feedback locations of a palm rest. In scenarios where a brightness spike is detected without a concurrent audio spike, only thermal feedback may be selected. In scenarios where an audio spike is detected without a concurrent brightness spike only mechanical feedback may be selected.

Based on the characteristics of the brightness and/or audio spikes and the type of haptic feedback selected, at block 570, locations on the palm rest may be selected for application of haptic feedback. As described, haptic feedback may be generated at different locations on a palm rest based on the location of a haptic event within gameplay relative to the position of the user's avatar. For instance, a stationary explosive event occurring to the left of the user's avatar may result in haptic feedback at locations on the left side of the palm rest, with the number of locations selected for feedback determined based on the distance of the event from the avatar. For example, in a scenario where the explosive events of FIG. 6 are stationary events, explosive event 615b may result in haptic feedback at locations 605a and 605b, while explosive event 615d may result in haptic feedback at location 605d, reflecting the fact that explosive event 615d is to the right of the avatar and occurs further from the avatar than explosive event 615b. In some embodiments, the determination of haptic feedback locations of the palm rest that are engaged in response to an explosive event may be based on the zone classification of the event. For instance, explosive events occurring in Zone 1 of display 600 may be mapped to haptic feedback at locations 605a, explosive events occurring in Zone 4 may be mapped to haptic feedback at locations 605a and 605b and explosive events spanning Zones 3 and 4 may be mapped to haptic feedback at all locations 605a-d along the length of the palm rest 605.

As described, explosive events may also be detected as being in motion, such as a launched projectile. As with explosive events that are stationary, one or more haptic feedback locations along palm rest 605 may be selected for explosive events in motion. For example, in a scenario where explosive event 615b travels along the indicated trajectory within Zone 4, locations 605a and 605b may be selected for feedback. In a scenario where explosive event 615d travels along the indicated trajectory within Zone 2, haptic feedback may be limited to location 605d, thus reflecting that the trajectory of explosive event 615d remains further from the avatar than the trajectory of explosive event 615b. In a scenario where explosive event 615a travels along the indicated trajectory from Zone 1 to Zone 3, a sequence of feedback at locations 605b and 605c may be selected in a manner that corresponds to the velocity of the trajectory relative to the avatar. In a non-illustrated scenario where explosive event 615a originates further to the left of the user's avatar and terminates further to the avatar's right, all locations 605a-d may be selected for feedback, thus reflecting the greater range of motion of the event across the avatar's field of view when compared to the illustrated trajectory of explosive event 615a.

In some embodiments, the locations 605a-d along palm rest 605 may be selected for haptic feedback based on characteristics of a concurrent audio spike. For instance, an explosive visual event occurring concurrently with a large audio spike, such as an audio spike of an amplitude that is two standard deviations above a mean amplitude of the audio, may result in haptic feedback at all locations 605a-d of the palm rest, while smaller magnitude explosive audio events may result in directional haptic feedback. For instance, the directional information determined based on the location of the explosive visual event relative to the user's avatar may be determined to provide feedback based on the explosive audio event. For instance, a determination that explosive event 615b occurs to the left of the user's avatar based on the classification of the visual brightness spike within Zone 4 may be utilized in the selection of locations for haptic feedback based on audio spikes.

Returning to FIG. 5, with the locations for providing haptic feedback selected, at block 575, the strength of the haptic feedback to be generated at each selected location is determined. In some embodiments, the strength of the haptic feedback may be selected based on the magnitude of the haptic event. For instance, the strength of the haptic feedback may increase according to the magnitude of an audio spike above a mean amplitude of the videogame audio. Accordingly, the larger the audio spike that is detected, the stronger the vibration feedback that will be generated by the mechanical actuator at a selected haptic feedback location. The strength of the haptic feedback may also increase according to the size of detected brightness spikes and their distance from the user's avatar. The larger and closer a brightness spike is to the user's avatar, the greater heat that may be produced by the thermoelectric generator at a selected haptic feedback location. For explosive events determined to be in motion where haptic feedback will be generated at multiple locations 605a-d, the strength of the haptic at each location may be selected based on the trajectory of the moving explosive event relative to the user's avatar. For instance, explosive event 615a moving on the illustrated trajectory may result in haptic feedback at locations 605b and 605c, where the strength of the feedback at locations 605c is greater that at location 605b, thus reflecting the trajectory of the explosive event from the left of the user's avatar to the right of the user's avatar, with the event in closer proximity to the right of the avatar as it approaches.

In scenarios where multiple haptic feedback locations on palm rest 605 have been selected for haptic feedback outputs, at block 580, the sequencing is determined for the activation of the feedback at each of these selected locations. For instance, for explosive event 615a moving along the indicated trajectory, haptic feedback may be generated at location 605b followed after some delay at location 605c, where this delay may be selected based on the speed of explosive event 615a along the indicated trajectory, thus providing the user with a sense of the speed of the event. In a non-illustrated scenario where an explosive event slowly moves from Zone 1 to Zone 2, a matching slow progression of haptic feedback may be generated at each of the locations, starting at location 605a and moving across the palm rest 605 until the sequence terminates with haptic feedback generated at location 605d. As described, in some scenarios, explosive events may occur in close proximity to the avatar such that all locations are selected for simultaneous haptic feedback, where the strength and duration of the feedback at each location may be selected based on the characteristics of the explosive event. In some embodiments, certain of such close-proximity explosive events or other types of explosive events that span all zones of the display 600, the haptic feedback may be randomized at all locations in order to reflect the chaotic nature of the explosive event. In other such chaotic situations, haptic feedback at all locations 605a-d may be pulsed for the duration of the event.

At block 585, the determined haptic feedback is generated, such as described with regard to the operation of the IHS of FIG. 1. In some embodiments, software drivers operating on an IHS may signal voltages to be applied to a mechanical actuator and a thermoelectric generator of haptic feedback modules located along the palm rest. In some instances, the timing, duration and magnitude of the voltages applied based on the operation of such drivers may serve to generate the described capabilities that provide users with haptic feedback in multiple dimensions, thus providing users with positional awareness of their avatar within a game space. Based on the provided haptic feedback, users are provided with sensory information relating the distance and direction of an event from the user's avatar, where such positional information may be provided using a combination of mechanical and thermal haptic feedback. As described, some embodiments may additionally incorporate the use of visual feedback, such as the activation of LEDs that may be incorporated in the described haptic feedback modules, or that may be separately implemented as features of the keyboard or palm rest.

In some embodiments, the described haptic feedback capabilities may be improved based on machine learning. For instance, machine learning algorithms may be used to analyze recorded gameplay in order to generate trained models that can be used in the identification of explosive audio events and explosive visual events. In some instances, user inputs may be provided during such training in order to provide the machine learning algorithms with positive examples of auditory spikes and explosive events during gameplay. User inputs may also be utilized to select the strength and location of provided feedback. In some embodiments, user inputs during such training may be used to generate classifications of explosive events for use in selecting different combinations of haptic feedback to be generated for different types of events. For instance, a thermoelectric generator may be capable of generating both heating and cooling sensations. User inputs during training may identify certain types of explosive events to be associated with cooling outputs rather than heat. For instance, user inputs during training may identify that the visual effects resulting from use of a special power by a character within the gameplay should result in cooling outputs. Provided with this positive example during training, the use of such special powers may thus be identified by the machine learning algorithm based on their brightness, color information, audio and/or various other characteristics of gameplay that accompany use of the special power. In this manner, machine learning algorithms may be used to adapt and improve the characteristics of the haptic feedback generated according to the embodiments described herein.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for providing haptic feedback during operation of a software program on an IHS (Information Handling System), the method comprising:
   detecting a haptic event in the operation of the software program on the IHS;
   determining a magnitude of the haptic event;
   determining a direction of the haptic event from a reference location in a user interface of the software program, wherein the software program is a video game and wherein the reference location in the user interface of the video game comprises a location of a video game avatar of a user of the IHS, and wherein the haptic event comprises an explosive visual event within the user interface of the video game and wherein the explosive visual event is detected based on detection of a brightness spike in an area of the user interface during operation of the video game;
   selecting one or more haptic feedback locations on a palm rest of a keyboard coupled to the IHS, wherein the haptic feedback locations on the palm rest are selected based on the magnitude of the haptic event and further based on the direction of the haptic event from the reference location; and
   generating mechanical feedback and thermal feedback at the selected haptic feedback locations of the palm rest, wherein a strength and a timing of the mechanical and thermal feedback at each location of the palm rest are selected based on the magnitude of the haptic event and further based on the direction of the haptic event from the reference location.

2. The method of claim 1, wherein the haptic event comprises an explosive audio event within operation of the video game and wherein the explosive audio event is detected based on detection of an amplitude spike in audio of the video game.

3. The method of claim 1, further comprising:
   classifying an area of the user interface in which the bright brightness spike is detected based on proximity of the area to the reference location of the video game avatar and further based on a direction of the area relative to the avatar.

4. The method of claim 3, wherein the one or more haptic feedback locations on the palm rest are further selected based on the classification of the area of the user interface in which the brightness spike is detected.

5. The method of claim 1, further comprising:
   determining the explosive visual event is in motion in the video game, wherein the timing of the mechanical and thermal feedback at each location of the palm rest is selected based characteristics of the motion of the explosive visual event.

6. The method of claim 5, wherein the characteristics of the motion of the explosive visual event comprise a direction of the motion relative to the avatar and wherein the timing of the mechanical and thermal feedback at each selected location of the palm rest relates the direction of the motion of the explosive visual event relative to the avatar.

7. The method of claim 1, wherein the one or more haptic feedback locations on the palm rest are selected based on a direction within the video game of the explosive visual event from the avatar.

8. An Information Handling System (IHS) configured for providing haptic feedback during operation of a software program, the IHS comprising:
   a keyboard comprising a palm rest with one or more haptic feedback locations;
   one or more processors;
   one or more memory devices coupled to the processors, the memory devices storing computer-readable instructions that, upon execution by the processors, cause the IHS to:
   detect a haptic event in the operation of the software program on the IHS;
   determine a magnitude of the haptic event;
   determine a direction of the haptic event from a reference location in a user interface of the software program, wherein the software program is a video game and wherein the reference location in the user interface of the video game comprises a location of a video game avatar of a user of the IHS, and wherein the haptic event comprises an explosive visual event within the user interface of the video game and wherein the explosive visual event is detected based on detection of a brightness spike in an area of the user interface during operation of the video game;
   select one or more haptic feedback locations on the keyboard palm rest, wherein the haptic feedback locations on the palm rest are selected based on the magnitude of the haptic event and further based on the direction of the haptic event from the reference location; and
   generate mechanical feedback and thermal feedback at the selected haptic feedback locations of the palm rest, wherein a strength and a timing of the mechanical and thermal feedback at each location of the palm rest are selected based on the magnitude of the haptic event and further based on the direction of the haptic event from the reference location.

9. The IHS of claim 8, wherein the one or more haptic feedback locations of the palm rest comprise a thermal generator coupled to a mechanical actuator.

10. The IHS of claim 8, wherein the haptic event comprises an explosive audio event within operation of the video game and wherein the explosive audio event is detected based on detection of an amplitude spike in audio of the video game.

11. The IHS of claim 8, wherein the one or more haptic feedback locations on the palm rest are selected based on a direction within the video game of the explosive visual event from the avatar.

12. A keyboard supporting key entry to an IHS (Information Handling System) during the operation of a software program on the IHS, the keyboard comprising:
   a plurality of keys;
   one or more logic units; and
   a palm rest with one or more haptic feedback locations, wherein the palm rest is detachable from the keyboard, and wherein one or more of the haptic feedback locations are selected for providing mechanical and thermal feedback in response to the detection of a haptic event in the operation of the software program on the IHS, wherein the one or more logic units of the palm rest are configured to:
   receive a signal activating a mechanical actuator at a plurality of the haptic feedback locations, wherein the plurality of haptic feedback locations on the palm rest are selected based on the magnitude of the haptic event and further based on the direction of the haptic event from the reference location; and
   generate mechanical feedback and thermal feedback at the selected haptic feedback locations of the palm rest, wherein a strength and a timing of the mechanical and thermal feedback at each location of the palm rest are selected based on the magnitude of the haptic event and further based on the direction of the haptic event from the reference location.

13. The keyboard of claim 12, wherein the one or more haptic feedback locations of the palm rest comprise a thermal generator coupled to a mechanical actuator.

14. The keyboard of claim 12, wherein the software application is a video game and wherein the reference location in the user interface of the video game comprises a location of a video game avatar of a user of the IHS.

15. The keyboard of claim 12, wherein the timing of the mechanical and thermal feedback generated at each of the selected haptic feedback of the locations of the palm rest is determined based on a direction of a movement of the haptic event relative the location of the avatar.

* * * * *